(12) United States Patent
Unno

(10) Patent No.: US 9,854,115 B2
(45) Date of Patent: Dec. 26, 2017

(54) DOCUMENT READING APPARATUS AND A METHOD FOR CONTROLLING A DOCUMENT READING APPARATUS

(71) Applicant: CANON KABUSHIKI KAISHA, Tokyo (JP)

(72) Inventor: Koichi Unno, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/254,420

(22) Filed: Sep. 1, 2016

(65) Prior Publication Data

US 2017/0070628 A1 Mar. 9, 2017

(30) Foreign Application Priority Data

Sep. 4, 2015 (JP) .................................. 2015-174412

(51) Int. Cl.
*H04N 1/00* (2006.01)

(52) U.S. Cl.
CPC ..... *H04N 1/00822* (2013.01); *H04N 1/00588* (2013.01); *H04N 1/00811* (2013.01); *H04N 2201/0091* (2013.01)

(58) Field of Classification Search
None
See application file for complete search history.

(56) References Cited

U.S. PATENT DOCUMENTS

| | | | | |
|---|---|---|---|---|
| 2001/0015828 A1* | 8/2001 | Miyamoto | ......... | H04N 1/00013 358/474 |
| 2002/0051242 A1* | 5/2002 | Han | ................... | H04N 1/00352 358/474 |
| 2002/0054401 A1* | 5/2002 | Sasaki | ................ | H04N 1/00236 358/538 |
| 2002/0080420 A1* | 6/2002 | Yokochi | ................. | H04N 1/047 358/471 |
| 2003/0214684 A1* | 11/2003 | Kuboki | .............. | H04N 1/00384 358/474 |
| 2005/0154782 A1* | 7/2005 | Yoshida | ............. | H04N 1/32117 709/206 |
| 2008/0174836 A1* | 7/2008 | Yoshihisa | .......... | H04N 1/00795 358/497 |

(Continued)

FOREIGN PATENT DOCUMENTS

JP 2010-278870 A 12/2010

*Primary Examiner* — Ming Hon
(74) *Attorney, Agent, or Firm* — Canon USA, Inc. I.P. Division

(57) ABSTRACT

It is possible to read a document at an optimal speed according to an operation mode selected by a user while improving productivity at a low cost, without forcing the user to perform a complicated operation for changing a document reading speed. A method for controlling a reading unit to read a document with a first reading resolution in a case where a reading resolution is the first reading resolution, to read a document with a second reading resolution in a case where the reading resolution is the second reading resolution smaller than the first reading resolution and a predetermined mode is not set, and to read a document with the first reading resolution in a case where the reading resolution is the second reading resolution smaller than the first reading resolution and the predetermined mode is set.

7 Claims, 11 Drawing Sheets

(56) References Cited

U.S. PATENT DOCUMENTS

| | | | |
|---|---|---|---|
| 2008/0175622 A1* | 7/2008 | Hashizume | G03G 15/50 399/208 |
| 2009/0207441 A1* | 8/2009 | Kotaka | H04N 1/00954 358/1.15 |
| 2012/0212788 A1* | 8/2012 | Miyazaki | H04N 1/0402 358/474 |
| 2012/0287444 A1* | 11/2012 | Osada | H04N 1/00068 358/1.2 |
| 2016/0072966 A1* | 3/2016 | Koue | H04N 1/0044 358/1.15 |
| 2016/0119501 A1* | 4/2016 | Kii | H04N 1/401 358/486 |

* cited by examiner

FIG.7

| MODE TYPE | RESOLUTION |
|---|---|
| NORMAL | 300 dpi |
| DOUBLE-SIDED | 300 dpi |
| SORT | 600 dpi |
| CONTINUOUS READ | 600 dpi |
| PAGE AGGREGATION | 600 dpi |
| DENSITY | 600 dpi |
| DOCUMENT TYPE | 600 dpi |
| COLOR ADJUSTMENT | 600 dpi |
| PAGE PRINTING | 600 dpi |
| NUMBER-OF-COPIES PRINTING | 600 dpi |
| SHARPNESS | 600 dpi |
| FRAME ELIMINATION | 300 dpi |
| STAMP | 600 dpi |
| DATE PRINTING | 600 dpi |
| MOVEMENT | 300 dpi |
| ID CARD COPY | 600 dpi |

DOCUMENT READING APPARATUS AND A METHOD FOR CONTROLLING A DOCUMENT READING APPARATUS

BACKGROUND OF THE INVENTION

Field of the Invention

The present invention relates to an image processing apparatus, a method for controlling the image processing apparatus, and a storage medium.

Description of the Related Art

In an image processing apparatus such as a digital copying machine, it has been an important issue to reduce mechanical costs while improving productivity. As one of solutions for such an issue, a technique for increasing a document reading speed of a scanner at the time of copying is discussed (refer to Japanese Patent Application Laid-Open No. 2010-278870). Although increasing the document reading speed of a scanner decreases a resolution for document reading, improving the document image reading speed per unit time enables improving productivity.

As methods for reading a document by using a scanner, the following two different methods are generally used.
(1) a pressing plate reading method in which a document placed on a glass plate (document positioning plate) is read while an optical reading apparatus is being moved along with the document
(2) a document feeding-reading method in which each document is conveyed from a document bundle placed on a dedicated tray and then read by a fixed optical reading apparatus while the document is being conveyed When switching the reading speed (more specifically, when changing the resolution), an image processing apparatus capable of reading a document by using the above-described two different methods generally uses the document feeding-reading method. This is because the document feeding-reading method in which the document conveying speed is changed achieves the reading speed switching at a lower cost than the pressing plate reading method in which an optical reading apparatus needs to be moved at variable speeds.

The document feeding-reading method performs the reading speed switching (more specifically, resolution switching) through an operation by a user. For example, when the user performs an operation for changing a read setting from a "speed priority" (speed is given priority) to an "image quality priority" (image quality is given priority) or vice versa, the reading speed in the document feeding-reading method is changed in response to this operation. The user changes the reading speed in the document feeding-reading method, taking into consideration a balance between the productivity at the time of copying and the quality of a printed image.

Conventionally, a copy function is provided with a continuous read function with which a document is read by switching between the pressing plate reading and the document feeding-reading methods, and then image data read by the pressing plate reading method and image data read by the document feeding-reading method can be printed as a set of image data.

However, when the above-described continuous read function is used, if the reading speed in the pressing plate reading method differs from that in the document feeding-reading method, the resolution of image data read by the pressing plate reading method differs from that of image data read by the document feeding-reading method. Therefore, in a printed product, a difference in image quality will arise between a page read by using the pressing plate reading method and a page read by using the document feeding-reading method.

To avoid such a situation, it was conventionally necessary to perform the above-described reading speed switching operation according to the copy function specified by the user. For example, when using the above-described continuous read function and when the reading speed setting for the document feeding-reading method differs from that for the pressing plate reading method, the user needed to perform an operation so that the reading speed in the document feeding-reading method coincides with that in the pressing plate reading method.

However, it is troublesome for the user to perform an operation for changing the reading speed in the document feeding-reading method taking such a setting into consideration each time the continuous read function is used. This will apply a load of operation to the user. A user who does not know about the above-described issue may not recognize even the necessity of taking the above-described reading speed into consideration, and accordingly may use the continuous read function without taking the above-described setting into consideration. As a result, a difference in image quality occurred between read pages, and there was a possibility that the user was unable to obtain an intended output product.

SUMMARY OF THE INVENTION

According to an aspect of the present invention, a document reading apparatus includes, a reading unit configured to read a document, a resolution setting unit configured to set a reading resolution of a document, a mode setting unit configured to set a predetermined mode, and a control unit configured to control the reading unit to read a document with a first reading resolution in a case where the reading resolution set by the resolution setting unit is the first reading resolution, to control the reading unit to read a document with a second reading resolution in a case where the reading resolution set by the resolution setting unit is the second reading resolution smaller than the first reading resolution and the predetermined mode is not set by the setting unit, and to control the reading unit to read a document with the first reading resolution in a case where the reading resolution set by the resolution setting unit is the second reading resolution smaller than the first reading resolution and the predetermined mode is set by the setting unit.

Further features of the present invention will become apparent from the following description of exemplary embodiments with reference to the attached drawings.

BRIEF DESCRIPTION OF THE DRAWINGS

FIG. 7 illustrates a data structure for a resolution corresponding to a copy mode of an image processing apparatus according to a second exemplary embodiment.

DESCRIPTION OF THE EMBODIMENTS

Exemplary embodiments of the present disclosure will be described below with reference to the accompanying drawings.

Figure 1:
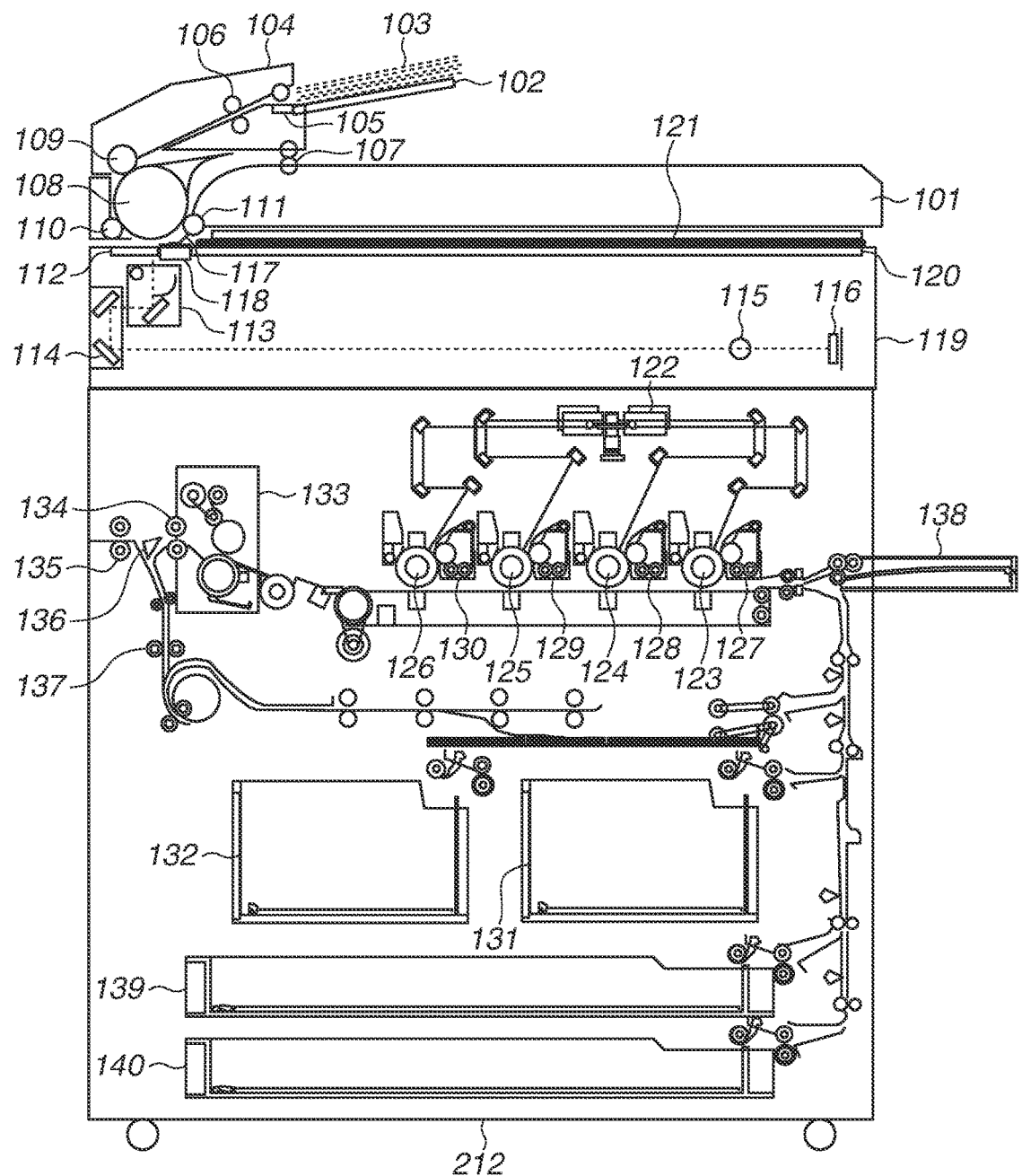
FIG. 1 is a sectional view illustrating an image processing apparatus according to a first exemplary embodiment of the present disclosure.

FIG. 1 is a sectional view illustrating an image processing apparatus 100 according to a first exemplary embodiment of the present disclosure.

Figure 2:
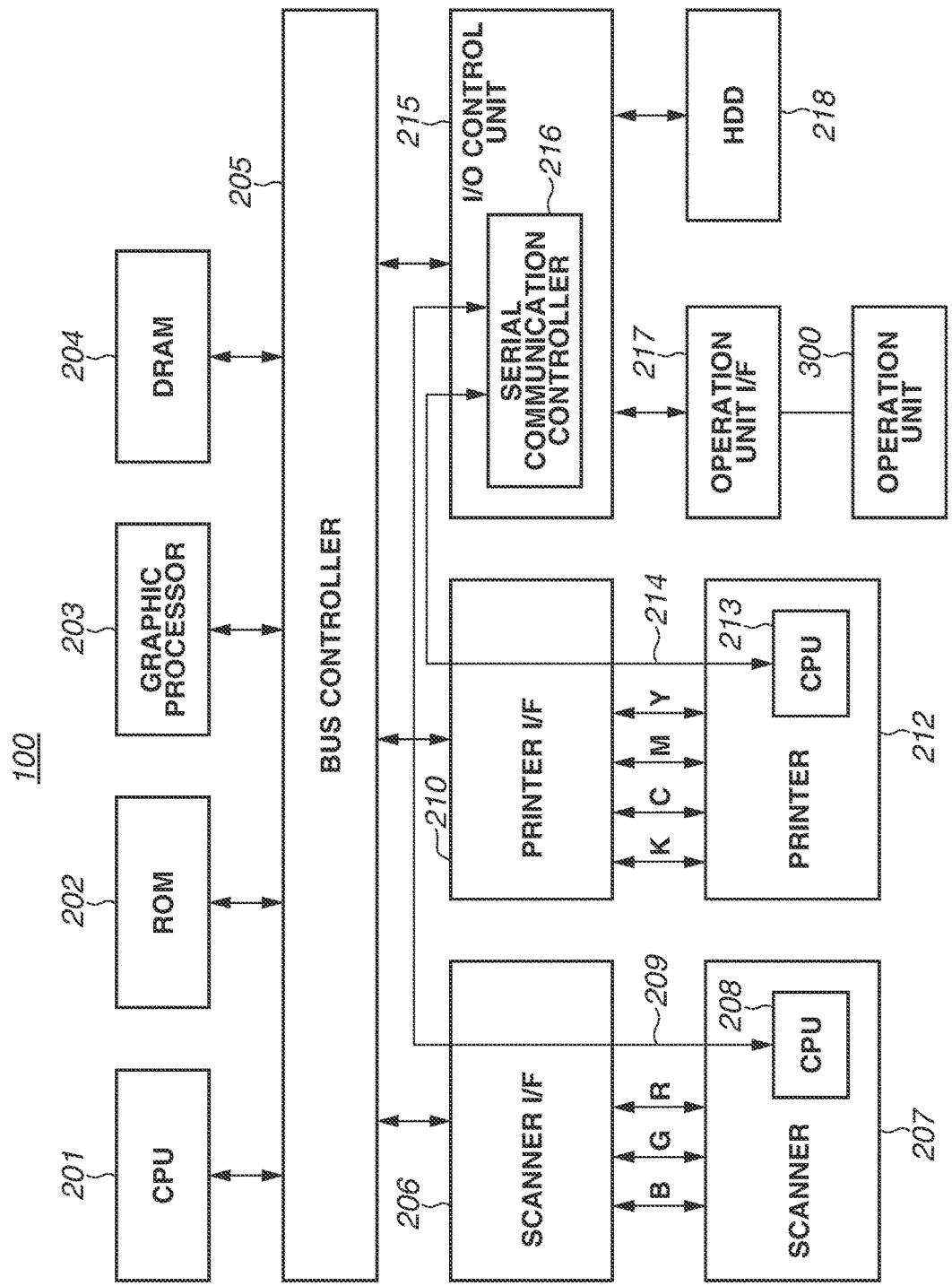
FIG. 2 is a block diagram illustrating an example of a configuration of the image processing apparatus.

FIG. 2 is a block diagram illustrating an example of a configuration of the image processing apparatus 100.

Figure 3:
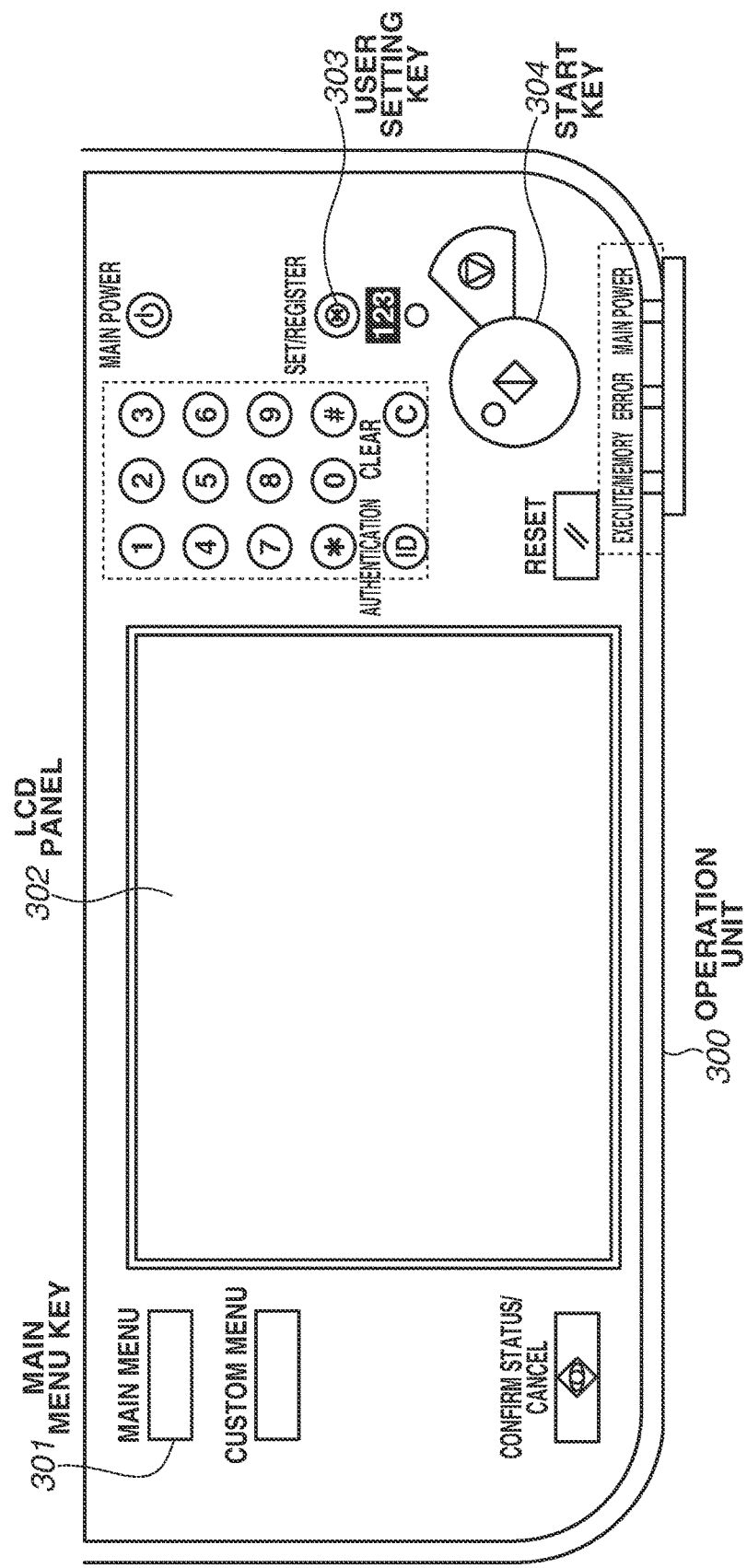
FIG. 3 illustrates an example of a configuration of an operation unit.

FIG. 3 illustrates an example of a configuration of an operation unit 300 of the image processing apparatus 100.

A central processing unit (CPU) 201 illustrated in FIG. 2 is the center of control in the image processing apparatus 100. The CPU 201 controls each block of the image processing apparatus 100 according to a control program stored in a read only memory (ROM) 202. The CPU 201 is also capable of controlling each block of the image processing apparatus 100 according to a control program loaded into a dynamic random access memory (DRAM) 204 from a hard disk drive (HDD) 218 by an initial program stored in the ROM 202 via an input/output (I/O) control unit 215.

An image read operation and an image print operation by the image processing apparatus 100 will be described below.

Information on a document 121 placed on a document positioning plate glass 120 illustrated in FIG. 1 is read by moving an exposure unit 113 of a document reading apparatus 119 along with the document 121 on the document positioning plate glass 120 (a pressing plate reading method). The document 121 is exposed to light by the exposure unit 113. Reflected light from the document 121 is transmitted to a mirror unit 114, passes through a lens 115 to be condensed, and is converted into an electric signal by a charge coupled device (CCD) sensor unit 116.

Information on a document 103 on a document tray 102 of the document feeding apparatus 101 is read while the document 103 is being moved relatively to the exposure unit 113 of the document reading apparatus 119 (a document feeding-reading method). The document 103 is set on the document tray 102. A document feed roller 104 and a separating pad 105 as a pair convey each of the documents 103. The conveyed document 103 is sent to the inside of the document feeding apparatus 101 by an intermediate roller pair 106, conveyed by a large roller 108 and a first driven roller 109, and further conveyed by the large roller 108 and a second driven roller 110.

The document 103 that has been conveyed by the large roller 108 and the second driven roller 110 passes through between a document feeding-reading document glass 112 and a document guide plate 117, passes through a jump stand 118, and is conveyed by the large roller 108 and a third driven roller 111. The document 103 that has been conveyed by the large roller 108 and the third driven roller 111 is discharged to the outside of the document feeding apparatus 101 by a document discharge roller pair 107. Between the document feeding-reading document glass 112 and the document guide plate 117, the document 103 is conveyed, in contact with the reading document glass 112, by the document guide plate 117.

When the document 103 passes through the document feeding-reading document glass 112, the surface in contact with the document feeding-reading document glass 112 is exposed to light by the exposure unit 113, and reflected light from the document 103 obtained as a result of exposure is transmitted to the mirror unit 114. The transmitted reflected light passes through the lens 115 to be condensed and is converted into an electric signal by the CCD sensor unit 116.

Image data of the document converted into the above-described electric signal is converted into a red, green, and blue (RGB) signal under control of a CPU 208 of a scanner 207, as illustrated in FIG. 2. Under control of the CPU 201, the RGB signal is temporarily stored in the DRAM 204 via a scanner interface (I/F) 206 and a bus controller 205 and then is stored in the HDD 218 via the I/O control unit 215. The scanner 207 includes the document feeding apparatus 101 and the document reading apparatus 119 illustrated in FIG. 1. The document feeding apparatus 101 and the document reading apparatus 119 are controlled by the CPU 208.

When printing the image data stored in the HDD 218, the image data stored in the HDD 218 is temporarily stored in the DRAM 204 under control of the CPU 201. Then, after color space conversion such as RGB-to-cyan, magenta, yellow, and black (CMYK) conversion is performed on the image data via a graphic processor 203, the image data is transmitted to a printer 212 via the printer I/F 210.

The image data transmitted to the printer 212 is converted into laser light by a laser unit 122 illustrated in FIG. 1 under control of a CPU 213. Then, images are formed on photosensitive drums 123, 124, 125, and 126 by laser light emitted from the laser unit 122.

The formed images are fixed onto fed paper (a sheet) by a fixing device 133 via development units 127, 128, 129, and 130 for making toner adhesion by using the capacitance of the images formed on the photosensitive drums 123, 124, 125, and 126. Paper is fed from paper feed stages 131, 132, 138, 139, and 140. The paper that passed the fixing device 133 is discharged to the outside of the image processing apparatus 100 by conveyance rollers 134 and 135. In case of double-sided printing, the paper that passed the fixing device 133 is sent to a path 137 via a flap 136, reversed on a switchback basis, and then fed again.

Figure 4:
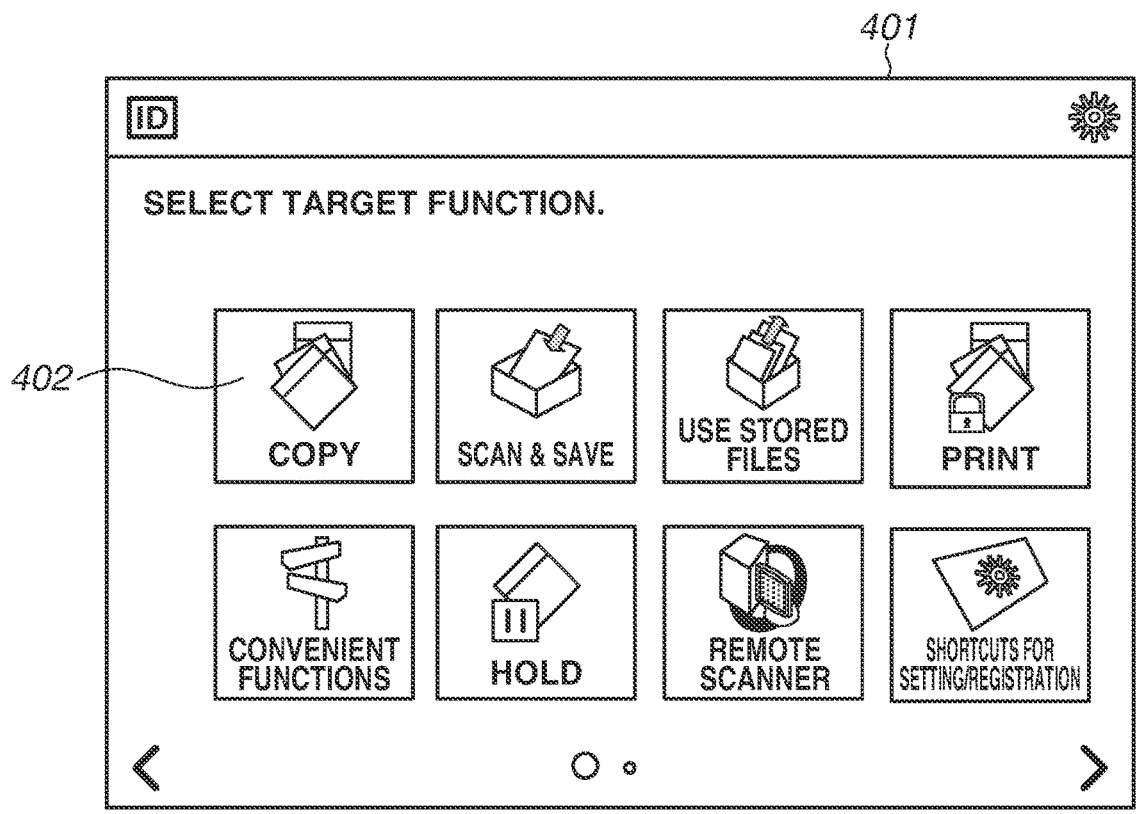
FIG. 4 illustrates an example of a main menu of the image processing apparatus.

When power of the image processing apparatus 100 is turned ON, the CPU 201 displays a main menu 401 as illustrated in FIG. 4 on a liquid crystal display (LCD) panel 302 of an operation unit 300 via the I/O control unit 215 and an operation unit I/F 217 according to a program stored in the ROM 202. The program to be executed by the CPU 201 may be a program in the DRAM 204. This program was stored in the HDD 218 and transferred to the DRAM 204 by an initial program in the ROM 202 via the I/O control unit 215.

FIG. 4 illustrates an example of the main menu 401 of the image processing apparatus 100.

Figure 10:
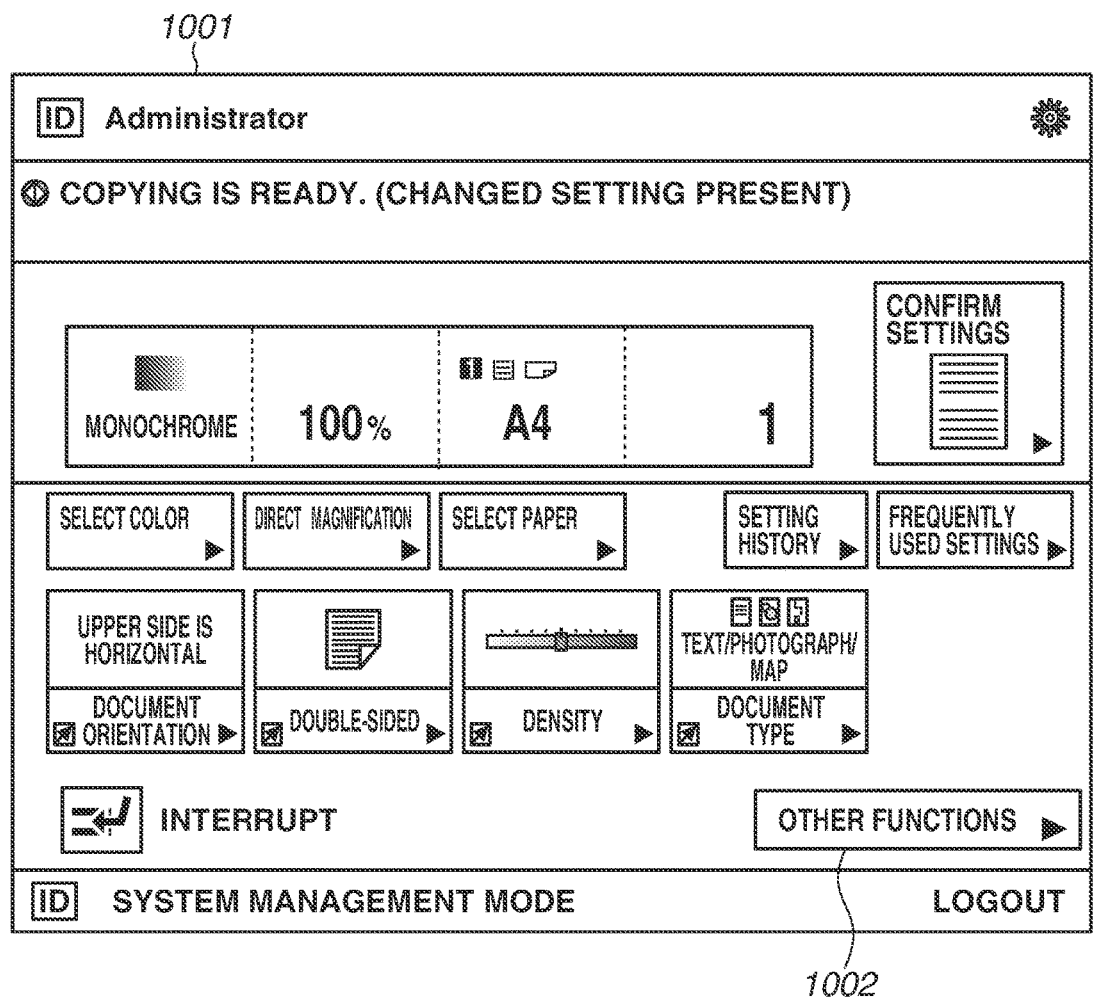
FIG. 10 illustrates an example of a copy function screen of the image processing apparatus.

In the main menu 401 as a portal screen, when the user presses a Copy icon 402, a copy screen 1001 (described below) as illustrated in FIG. 10 is displayed on the LCD panel 302, enabling copy operations. The main menu 401 is also displayed when the user presses a main menu key 301.

The surface of the LCD panel 302 illustrated in FIG. 3 serves as a touch sensor. When the user presses any desired area, the CPU 201 is notified of the pressed position via the operation unit I/F 217 and the I/O control unit 215. The CPU 201 determines whether an area displayed as a button is pressed based on the notified position and the screen currently displayed on the LCD panel 302. When the CPU 201 determines that an area displayed as a button is pressed, the CPU 201 performs processing according to a program in the ROM 202 or a program stored in the DRAM 204.

When the user presses a user setting key 303, the CPU 201 is notified of the depression of the user setting key 303 via the operation unit I/F 217 and the I/O control unit 215. The CPU 201, which has been notified of the depression of the user setting key 303, displays a user mode setting screen 801 as illustrated in FIG. 8 on the LCD panel 302 via the I/O control unit 215 and the operation unit I/F 217 according to a program stored in the ROM 202.

The user mode setting screen 801 will be described below with reference to FIG. 8.

Figure 8:
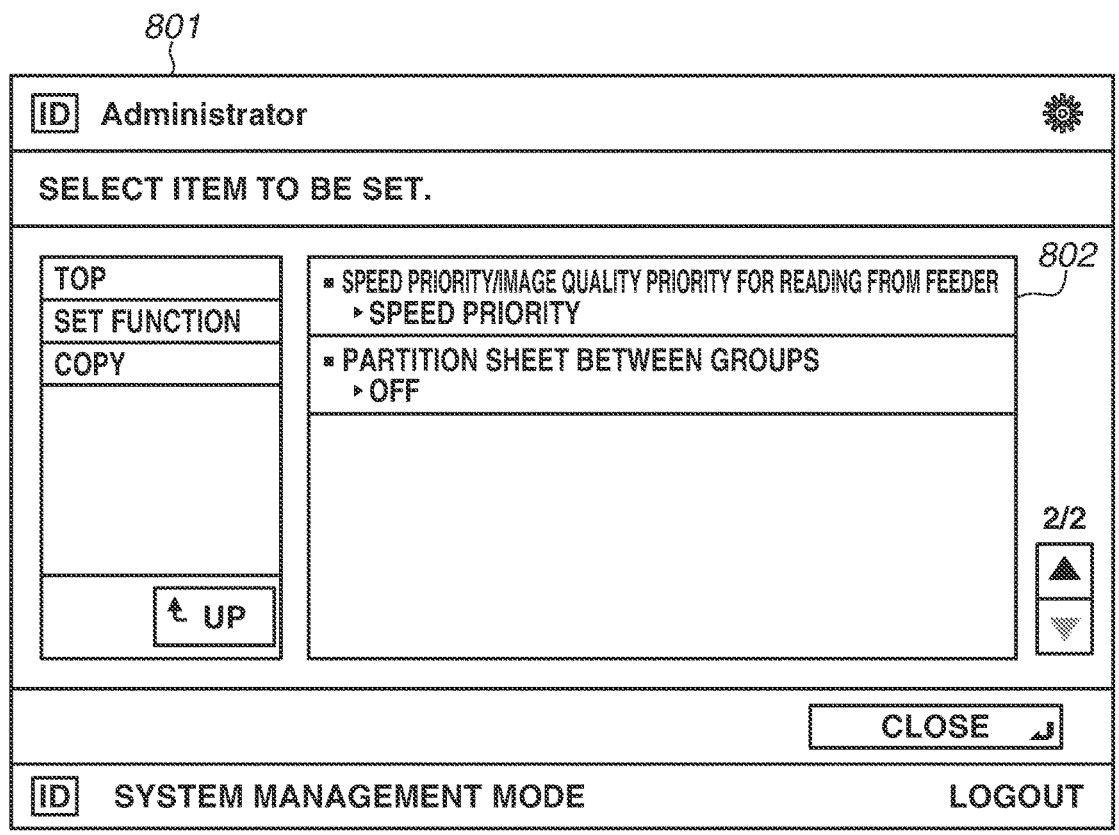
FIG. 8 illustrates an example of a user mode setting screen of the image processing apparatus.

FIG. 8 illustrates an example of the user mode setting screen 801 of the image processing apparatus 100.

Figure 9:
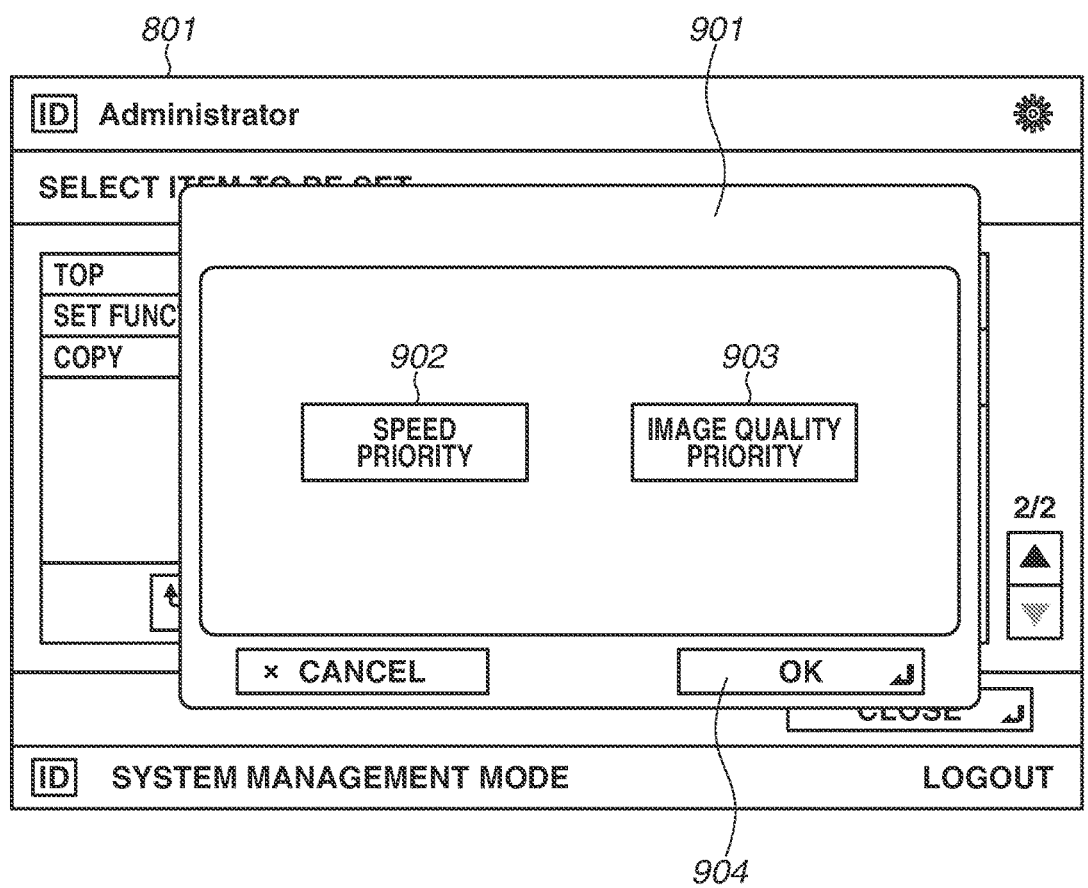
FIG. 9 illustrates an example of a speed priority/image quality priority selection screen of the image processing apparatus.

When the user selects a speed priority/image quality priority setting menu 802 of the user mode setting screen 801, the CPU 201 is notified of the selection of the speed priority/image quality priority setting menu 802 similar to the above-described case, and the CPU 201 displays a speed priority/image quality priority selection screen 901 as illustrated in FIG. 9 on the LCD panel 302.

The speed priority/image quality priority selection screen 901 will be described below with reference to FIG. 9.

FIG. 9 illustrates an example of the speed priority/image quality priority selection screen 901 as a mode select screen of the image processing apparatus 100.

In the present exemplary embodiment, the speed priority/image quality priority selection screen 901 is used to make setting related to a reading speed (more specifically, a reading resolution) for the document feeding-reading method in the copy function.

When the user selects either a Speed Priority button 902 or an Image Quality Priority button 903 displayed on the speed priority/image quality priority selection screen 901 and then presses an OK button 904, the CPU 201 is notified of the selected content via the operation unit I/F 217 and the I/O control unit 215. The CPU 201 stores the notified content in a read setting content 602 of the read setting 601 illustrated in FIG. 6 in the DRAM 204. The Speed Priority button 902 is used to make setting for reading the document 103 at a high speed (i.e., with a low resolution). On the other hand, the Image Quality Priority button 903 is used to make setting for reading the document 103 with a high resolution (i.e., at a low speed).

Figure 6:
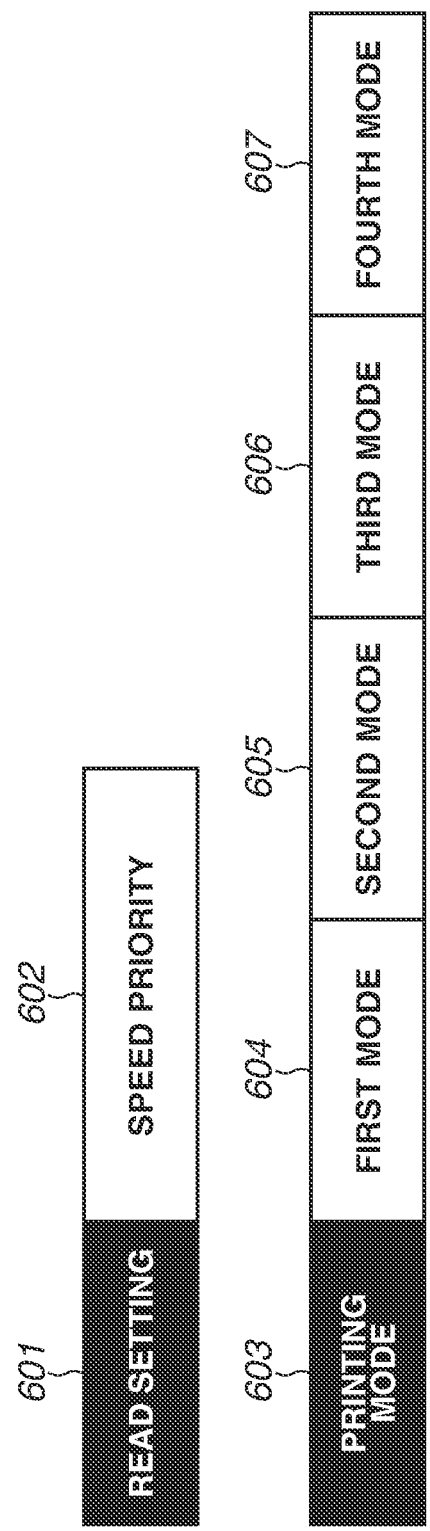
FIG. 6 illustrates data structures for a read setting and an operation mode of the image processing apparatus.

FIG. 6 illustrates examples of data structures for the read setting and mode information on a memory (DRAM 204) of the image processing apparatus 100.

When reading information of the document 103 on the document tray 102 of the document feeding apparatus 101, the image processing apparatus 100 according to the present exemplary embodiment changes conveyance control for the document 103 based on the data stored in the read setting content 602.

When reading the document 103 on the document tray 102 of the document feeding apparatus 101, the CPU 201 determines the content of the read setting content 602. When a speed priority setting is stored, the CPU 201 notifies, via a serial communication controller 216, the CPU 208 of the scanner that a speed priority is set before the document feed roller 104 operates.

The CPU 208, which has been notified of a speed priority setting by the CPU 201, conveys the document 103 on the document tray 102 by controlling the rollers 104, 106, 108, 109, 110, and 111 to set a conveying speed which is twice the standard speed. The standard speed is a predetermined speed which is, for example, equivalent to 600 dots per inch (dpi). In this example, in a case of a speed priority, the CPU 208 will convey the document 103 at a speed equivalent to 300 dpi as a speed twice the standard speed.

The document 103 that has been conveyed at a doubled conveying speed is exposed to light by the exposure unit 113, and reflected light is read by the CCD sensor unit 116. The image data of the document 103 read by the CCD sensor unit 116 is sent to the graphic processor 203 via the scanner I/F 206. Then, the CPU 201 converts the resolution in the main scanning direction. After that, the image data is stored in the HDD 218 via the DRAM 204 and the I/O control unit 215.

On the other hand, when an image quality priority setting is stored in the read setting content 602, the CPU 201 notifies, via the serial communication controller 216, the CPU 208 of the scanner that an image quality priority is set before the document feed roller 104 operates. The CPU 208, which has been notified of an image quality priority setting by the CPU 201, conveys the document 103 on the document tray 102 by controlling the rollers 104, 106, 108, 109, 110, and 111 to set the conveying speed to the standard speed (equivalent to 600 dpi).

As described above, the image processing apparatus 100 according to the present exemplary embodiment is capable of reading a document by using the pressing plate reading method or the document feeding-reading method. In the pressing plate reading method, the document 121 in a stopped state on the document positioning plate glass 120 is read while the exposure unit 113 is being moved at a predetermined speed. In the document feeding-reading method, the document 103 set on the document tray 102 is conveyed at a speed specified by the CPU 201 and is read while the document is being conveyed. The image processing apparatus 100 reads a document by using the pressing plate reading method or the document feeding-reading method, and generates image data with a resolution according to the reading speed.

Operations at the time of printing according to the present exemplary embodiment will be described below with reference to a flowchart illustrated in FIG. 5.

Figure 5:
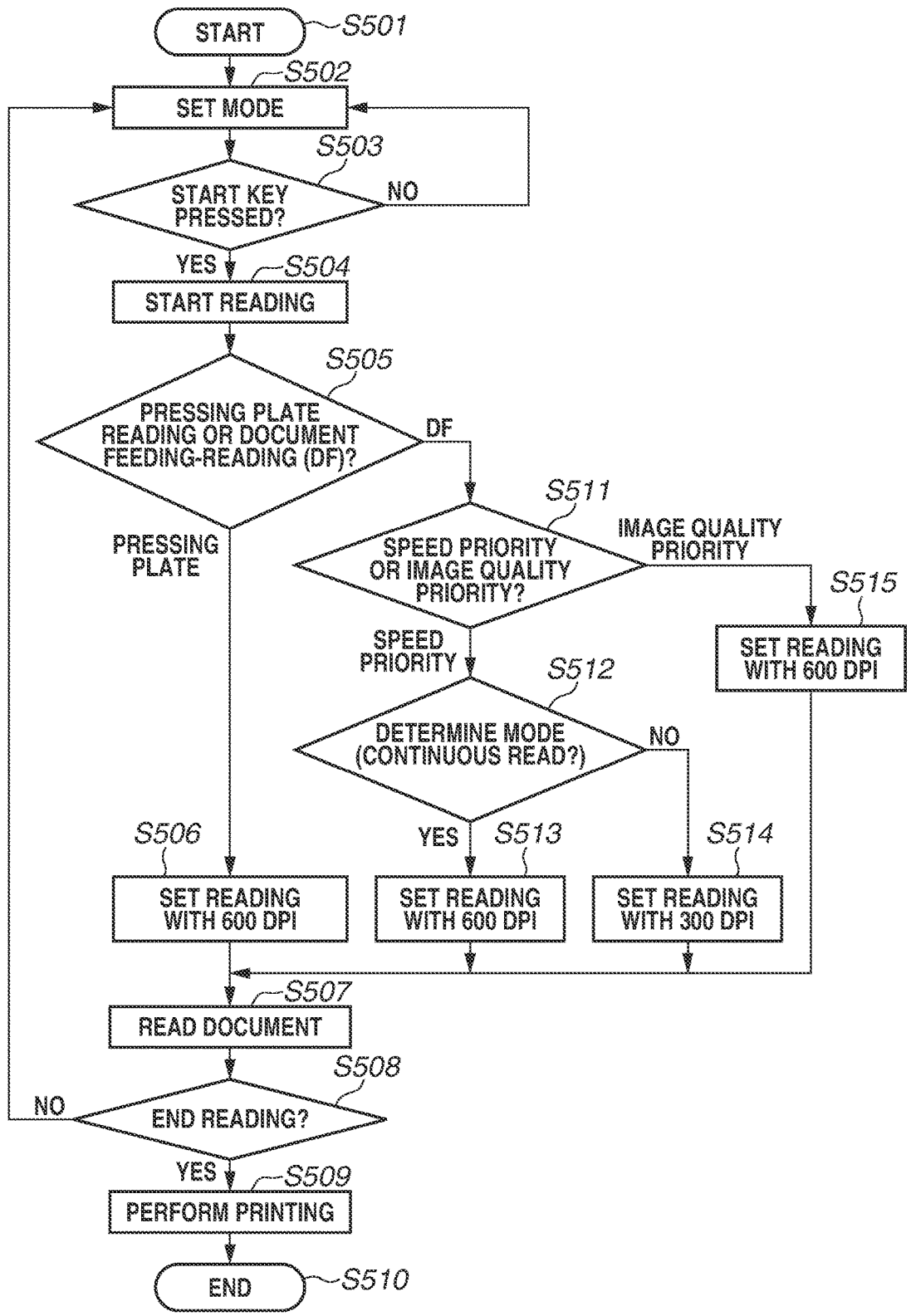
FIG. 5 is a flowchart illustrating an example of an operation performed by the image processing apparatus at the time of copying.

FIG. 5 is a flowchart illustrating an example of an operation performed by the image processing apparatus 100 at the time of copying. Processing of this flowchart is implemented when the CPU 201 executes a program stored in the ROM 202 (or a program loaded from the HDD 218 into the DRAM 204).

When the user presses the Copy icon 402 in the portal screen 401 illustrated in FIG. 4 displayed on the LCD panel 302, the CPU 201 detects the operation via the operation unit I/F 217 and the I/O control unit 215. In response to the detection, the CPU 201 displays a copy screen 1001 illustrated in FIG. 10 on the LCD panel 302 via the I/O control unit 215 and the operation unit I/F 217 according to a program stored in the ROM 202. In step S501, the CPU 201 starts processing of the flowchart illustrated in FIG. 5.

In steps S502 and S503, the CPU 201 receives a mode setting at the time of copying and depression of a start key 304.

FIG. 10 illustrates an example of the copy screen 1001 of the image processing apparatus 100.

The copy screen 1001 includes an Other Functions button 1002. When the user presses the Other Functions button 1002, the CPU 201 is notified of such operation via the operation unit I/F 217 and the I/O control unit 215.

Figure 11:
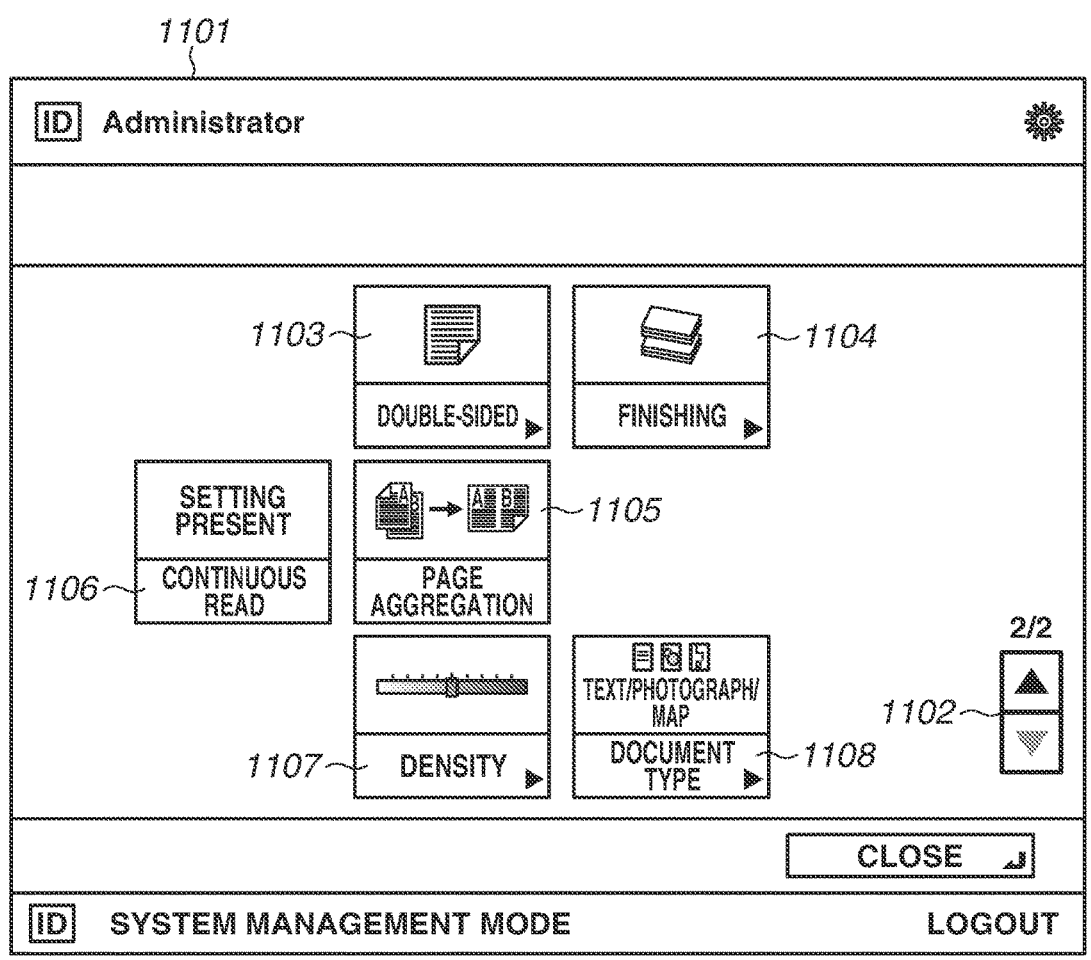
FIG. 11 illustrates an example of a mode setting screen of the image processing apparatus.

When the user presses the Other Functions button 1002, the CPU 201 displays a mode setting screen 1101 illustrated in FIG. 11 on the LCD panel 302 via the I/O control unit 215 and the operation unit I/F 217. Then, the CPU 201 receives a mode setting at the time of copying from the mode setting screen 1101.

FIG. 11 illustrates an example of the mode setting screen 1101 of the image processing apparatus 100.

The mode setting screen 1101 displays a Double-Sided button 1103, a Finishing button 1104, a Page Aggregation button 1105, a Continuous Read button 1106, a Density button 1107, and a Document Type button 1108 and allows the user to set an operation mode (a printing mode) at the time of printing.

The Double-Sided button 1103 is used to make setting for performing double-sided printing of a read document. The Finishing button 1104 is used to specify whether staple processing is to be performed on printed paper. The Page Aggregation button 1105 is used to make setting for combining image data of a plurality of read documents to place a plurality of images on a print sheet. The Continuous Read button 1106 is used to set a document reading mode while switching between the document 121 on the document positioning plate glass 120 and the document 103 on the document tray 102. More specifically, the Continuous Read button 1106 enables reading a document a plurality of times while switching between the pressing plate reading method and the document feeding-reading method. This button is used to set an operation mode in which image data generated by a plurality of document reading is processed as a set of image data. The Density button 1107 is used to adjust a print density. The Document Type button 1108 is used to specify a type of document.

When the user presses any one of the buttons 1103 to 1108 on the mode setting screen 1101 displayed on the LCD panel 302, the CPU 201 detects the pressed button via the operation unit I/F 217 and the I/O control unit 215. In response to the detection, the CPU 201 records the pressed button in one of areas (a First Mode 604, a Second Mode 605, a Third Mode 606, and a Fourth Mode 607) for a Printing Mode 603 illustrated in FIG. 6 in the DRAM 204. For example, when the user presses the Continuous Read button 1106, the CPU 201 records the depression of the Continuous Read button 1106 in one of areas (the First Mode 604, the Second Mode 605, the Third Mode 606, and the Fourth Mode 607) for the Printing Mode 603. When the user makes a plurality of settings on the mode setting screen 1101, the CPU 201 records a plurality of settings in each of areas (the First Mode 604, the Second Mode 605, the Third Mode 606, and the Fourth Mode 607) for the Printing Mode 603.

When the user presses the start key 304 of the operation unit 300 in this state (YES in step S503), the CPU 201 detects the depression of the start key 304 via the operation unit I/F 217 and the I/O control unit 215. When the CPU 201 detects the depression of the start key 304 (YES in step S503), then in step S504, the CPU 201 starts processing for reading a document. The CPU 201 makes, via the serial communication controller 216, an inquiry about whether the document is set on the document tray 102 to the CPU 208 of the scanner 207. The CPU 208 detects whether a document exists between the document feed roller 104 and the separating pad 105 to determines whether the document 103 exists on the document tray 102. When the document 103 exists, the CPU 208 notifies the CPU 201 of the existence of the document 103 via the serial communication controller 216.

Upon reception of a notification as a result of the above-described inquiry from the CPU 208, then in step S505, the CPU 201 determines the reading method ("pressing plate reading" or "document feeding-reading (DF))" based on the result of the inquiry. When the document 103 is not set on the document tray 102, the CPU 201 determines the reading method as "pressing plate reading." On the other hand, when the document 103 is set on the document tray 102, the CPU 201 determines the reading method as "document feeding-reading (DF)."

When the CPU 201 determines the reading method as "pressing plate reading" ("Pressing Plate" in step S505), then in step S506, the CPU 201 instructs the CPU 208 to read the document 121 on the document positioning plate glass 120 at the standard speed (equivalent to 600 dpi) (This setting is referred to as a 600-dpi read setting).

On the other hand, when the CPU 201 determines the reading method as "document feeding-reading (DF)" ("DF" in step S505), the processing proceeds to step S511.

In step S511, the CPU 201 determines whether the content recorded in the read setting content 602 stored in the read setting 601 is a "speed priority" or an "image quality priority."

When the CPU 201 determines that the content recorded in the read setting content 602 stored in the read setting 601 is an "image quality priority" ("Image Quality Priority" in step S511), then in step S515, the CPU 201 instructs the CPU 208 to read the document 103 on the document tray 102 at the standard speed (equivalent to 600 dpi) based on the read setting 601 (a speed priority or an image quality priority) (This setting is referred to as a 600-dpi read setting).

On the other hand, when the CPU 201 determines that the content recorded in the read setting content 602 stored in the read setting 601 is a "speed priority" ("Speed Priority" in step S511), the processing proceeds to step S512.

In step S512, based on the data stored in the First Mode 604, the Second Mode 605, the Third Mode 606, and the Fourth Mode 607 for the Printing mode 603 stored in the DRAM 204, the CPU 201 performs mode determination, i.e., the CPU 201 determines whether a specific mode ("Continuous Read" in the present exemplary embodiment) is included in the recorded contents. Data items indicating the content selected by the user in the mode setting screen 1101 are stored in the Print Mode 603 (the First Mode 604, the Second Mode 605, the Third Mode 606, and the Fourth Mode 607).

When the CPU 201 determines that the above-described specific mode ("Continuous Read" in the present exemplary embodiment) is included in the contents recorded in the Print Mode 603 (the First Mode 604, the Second Mode 605, the Third Mode 606, and the Fourth Mode 607) (YES in step S512), then in step S513, the CPU 201 instructs the CPU 208 to read the document 103 on the document tray 102 at the standard speed (equivalent to 600 dpi) regardless of the read setting 601 (a speed priority or an image quality priority) (This setting is referred to as a 600-dpi read setting). More specifically, the CPU 201 instructs the CPU 208 to use the same reading speed as the pressing plate reading method.

On the other hand, when the CPU 201 determines that the above-described specific mode ("Continuous Read" in the present exemplary embodiment) is not included in the contents recorded in the Print Mode 603 (the First Mode 604, the Second Mode 605, the Third Mode 606, and the Fourth Mode 607) (NO in step S512), then in step S514, based on the read setting 601 (a speed priority or an image quality priority), the CPU 201 instructs the CPU 208 to read the document 103 on the document tray 102 at a speed (equivalent to 300 dpi) which is twice the standard speed (This setting is referred to as a 300-dpi read setting). More specifically, the CPU 201 instructs the CPU 208 to use the reading speed in the speed priority.

Upon reception of an instruction from the CPU 201 via the serial communication controller 216 in step S506, S513, S514, or S515, the CPU 208 sequentially reads the documents 103 on the document tray 102 at a set speed and transfers image data via the scanner I/F 206. In step S507, the CPU 201 converts the resolution in the main scanning direction for the image data transferred from the CPU 208 by using the graphic processor 203 and then stores the image data in the HDD 218 via the DRAM 204 and the I/O control unit 215.

In the case of the "document feeding-reading (DF)", when the CPU 208 detects that all of the documents 103 on the document tray 102 have been read, the CPU 208 notifies CPU 201 of the end of the image read operation.

When the document 121 on the document positioning plate glass 120 has been read or when all of the documents 103 on the document tray 102 have been read, the CPU 201 determines whether reading is to end.

For example, when "Continuous Read" is included in the Printing Mode 603, the CPU 201 waits for a user instruction again. When the user presses an "End Reading" button (not illustrated) on the operation unit 300, the CPU 201 determines that reading is to end. On the other hand, when the "End Reading" button is not pressed, the CPU 201 determines that reading is not to end.

When "Continuous Read" is not included in the Printing Mode 603, the CPU 201 determines that reading is to end when the document 121 on the document positioning plate glass 120 has been read or when all of the documents 103 on the document tray 102 have been read.

When the CPU 201 determines that reading is not to end (NO in step S508), the processing returns to step S502.

On the other hand, when the CPU 201 determines that reading is to end (YES in step S508), the processing proceeds to step S509.

In step S509, the CPU 201 rasterizes in the DRAM 204 the image data stored in the HDD 218 through the document reading in step S507. The CPU 201 further performs image processing by the graphic processor 203 according to the setting content stored in the Print Mode 603 (the First Mode 604, the Second Mode 605, the Third Mode 606, and the Fourth Mode 607) and then performs print processing by transferring the image data to the printer 212 via the printer I/F 210.

Referring to the example illustrated in FIG. 5, in step S511, the CPU 201 determines the read setting 601 (a speed priority or an image quality priority) and then, in step S512, the CPU 201 determines whether a specific mode is set. However, the CPU 201 may determine whether a specific mode is set and then determine the read setting 601 (a speed priority or an image quality priority). More specifically, when a specific mode is set, the CPU 201 instructs the CPU 208 to read the document at the standard speed (equivalent to 600 dpi) which is the same as the reading speed for pressing plate reading. On the other hand, when a specific mode is not set, the CPU 201 instructs the CPU 208 to read a document at a speed based on the read setting 601 (a speed priority or an image quality priority).

Although, in the above-described exemplary embodiment, a copy function is used, the present disclosure is applicable even in a case where other functions are used if a function including the document reading is used. The present disclosure is applicable, for example, to a case where a scanning function is used and a case where a facsimile transmission function is used.

For example, as a mode setting at the time of scanning, at least a continuous read mode can be set from a mode setting screen (not illustrated) for the scanning function. In the continuous read mode, the document 121 on the document positioning plate glass 120 and the document 103 on the document tray 102 are read on a switching basis. When using the scanning function, the CPU 201 performs control to perform processing in steps S502 to S508 illustrated in FIG. 5. More specifically, in the case of the document feeding-reading (DF), when the above-described specific mode (the present exemplary embodiment "Continuous Read") is set, the CPU 201 performs control to read the document 103 at the standard reading speed which is the same as the reading speed for the pressing plate reading regardless of the read setting 601 (a speed priority or an image quality priority). This also applies to the facsimile transmission function.

As described above, in the case of document feeding-reading, when a specific mode (for example, "Continuous Read") is set, the CPU 201 performs control to read the document at the standard reading speed regardless of the read setting 601 (a speed priority or an image quality priority) related to the reading speed. This enables an image processing apparatus having an inexpensive configuration to automatically switch between reading with an emphasis on productivity and reading with an emphasis on image quality according to the operation mode specified by the user for a function including the document reading such as the copy function. Therefore, it is possible to provide an image processing apparatus capable of reading a document at an optimal speed (with an optimum resolution) according to the operation mode selected by the user while improving productivity at a low cost without forcing the user to perform a complicated operation for changing the document reading speed, at the time of continuous read.

In the above-described first exemplary embodiment, in the case of the document feeding-reading, when "Continuous Read" is set, the CPU 201 performs control to read the document 103 at the standard reading speed which is the same as the reading speed for the pressing plate reading regardless of the read setting 601 (a speed priority or an image quality priority). In a present second exemplary embodiment, in the case of the document feeding-reading, not only when "Continuous Read" is set but also when a mode corresponding to a reading speed different from that for the pressing plate reading is set, the CPU 201 reads the document 103 at the standard reading speed similar to the case of "Continuous Read." Only differences from the first exemplary embodiment will be described below.

FIG. 7 illustrates an example of a data structure for providing the resolution corresponding to a copy mode on a memory (DRAM 204) of the image processing apparatus 100 according to the second exemplary embodiment. Data items illustrated in FIG. 7 are assumed to be prestored in the ROM 202.

In the second exemplary embodiment, in step S512 illustrated in FIG. 5, the CPU 201 determines the mode based on the data stored in the Print Mode 603 (the First Mode 604, the Second Mode 605, the Third Mode 606, and the Fourth Mode 607) stored in the DRAM 204 and on a table including a mode type 701 and a resolution 702 illustrated in FIG. 7. Data items indicating contents selected by the user in the mode setting screen 1101 illustrated in FIG. 11 are stored in the Print Mode 603 (the First Mode 604, the Second Mode 605, the Third Mode 606, and the Fourth Mode 607).

In step S512, the CPU 201 searches for a content recorded in the First Mode 604 in elements 703 of the mode type 701 and acquires an element 704 of the resolution 702 corresponding to the mode type 701. The CPU 201 sequentially performs this processing on the First Mode 604, the Second Mode 605, the Third Mode 606, and the Fourth Mode 607. Based on this result, the CPU 201 determines whether a specific printing mode corresponding to the 600 dpi-resolution is included in the contents recorded in the Print Mode 603 (the First Mode 604, the Second Mode 605, the Third Mode 606, and the Fourth Mode 607).

When the CPU 201 determines that the above-described specific printing mode (a printing mode corresponding to the 600 dpi-resolution) is included in the contents recorded in the Print Mode 603 (the First Mode 604, the Second Mode 605, the Third Mode 606, and the Fourth Mode 607) (YES in step S512), then in step S513, the CPU 201 instructs the CPU 208 to read the document 103 on the document tray 102 at the standard speed (equivalent to 600 dpi) regardless of the read setting 601 (a speed priority or an image quality priority) (This setting is referred to as a 600-dpi read setting).

On the other hand, when the CPU 201 determines that the above-described specific printing mode is not included in the contents recorded in the Print Mode 603 (the First Mode 604, the Second Mode 605, the Third Mode 606, and the Fourth Mode 607), i.e., all printing modes correspond to the 300-dpi resolution (NO in step S512), then in step S514, the CPU 201 instructs the CPU 208 to read the document 103 on the document tray 102 at a reading speed twice the standard speed (equivalent to 300 dpi) based on the read setting 601 (a speed priority or an image quality priority) (This setting is referred to as a 300-dpi read setting).

Other steps are similar to those according to the first exemplary embodiment, and redundant descriptions thereof will be omitted.

As described above, in the case of the document feeding-reading, when a specific mode in which the reading speed is different from that for the pressing plate reading is set, the CPU 201 performs control to read the document 103 at the standard reading speed regardless of the read setting 601 (a speed priority or an image quality priority). This enables an image processing apparatus having an inexpensive configuration to automatically switch between reading with an emphasis on productivity and reading with an emphasis on image quality according to the operation mode specified by the user for a function including the document reading such as the copy function. Therefore, it is possible to provide an image processing apparatus capable of reading a document at an optimal speed (with an optimum resolution) according to the operation mode selected by the user while improving productivity at a low cost without forcing the user to perform a complicated operation for changing the document reading speed.

Conventionally, for example, when a printing mode corresponding to 600 dpi is used, reading a document at a reading speed corresponding to 300 dpi with the document feeding-reading causes a difference between the resolution required in the printing mode and the resolution of the document read by using the document feeding-reading method. Therefore, there has been an issue that a user cannot obtain an intended output result. Conventionally, to avoid such a situation from occurring, the user needed to perform the above-described operation for changing the reading speed according to a copy function specified by the user. For example, the user needed to change a setting related to the reading speed for the document feeding-reading method to achieve a reading speed corresponding to the printing mode specified by the user. Such an operation applied an operation load to the user. A user who does not know about the above-described issue may use the continuous read function without taking the above-described setting into consideration. As a result, there was a possibility that the user was unable to obtain an intended output product. However, according to the second exemplary embodiment, it becomes possible to read a document at the optimal speed for an operation mode selected by the user while improving productivity at a low cost, without forcing the user to perform a complicated operation.

The configurations and contents of the above-described various data are not limited thereto, and may include various configurations and contents according to the user's application and purpose.

Although the present disclosure has been described above based on one exemplary embodiment, the present disclosure can be embodied, for example, as a system, an apparatus, a method, a program, or a storage medium. More specifically, the present disclosure is applicable to a system including a plurality of apparatuses and to an apparatus including one apparatus.

Further, all of configurations derived by suitably combining the above-described exemplary embodiments are also intended to be included in the present disclosure.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-174412, filed Sep. 4, 2015, which is hereby incorporated by reference herein in its entirety.

What is claimed is:

1. A document reading apparatus comprising:
   a conveying unit configured to convey a document;
   a reading unit configured to execute first reading processing of reading a document on a platen glass with a setting of a first resolution and second reading processing of reading a document being conveyed by the conveying unit;
   a resolution receiving unit configured to receive a setting of a resolution in the second reading processing;
   a mode receiving unit configured to receive a setting of a reading mode for outputting, according to reception of a reading end instruction after reading a plurality of documents according to a plurality of reading instructions, images of documents obtained through the plurality of reading instructions; and
   a resolution setting unit configured to set the resolution in the second reading processing to a second resolution based on the resolution receiving unit having received the setting of the second resolution smaller than a first resolution and the mode receiving unit having not received the setting of the reading mode, and to set the resolution in the second reading processing to the first resolution based on the resolution receiving unit having received the setting of the second resolution and the mode receiving unit having received the setting of the reading mode,
   wherein the resolution setting unit is implemented by at least one processor.

2. The document reading apparatus according to claim 1, wherein a conveying speed of document conveyance by the conveying unit in a case where the second reading processing reads a document with the setting of the second resolution is higher than the conveying speed of the document conveyance by the conveying unit in a case where the second reading processing reads the document with the setting of the first resolution.

3. The document reading apparatus according to claim 1, wherein the resolution setting unit sets the resolution in the second reading processing to the first resolution based on the resolution receiving unit having received the setting of the first resolution.

4. A document reading apparatus comprising:
   a conveying unit configured to convey a document;
   a reading unit configured to execute first reading processing of reading a document on a platen glass and second reading processing of reading a document being conveyed by the conveying unit;
   a resolution receiving unit configured to receive a setting of a resolution in the second reading processing; and
   a mode receiving unit configured to receive a setting of a reading mode for outputting, according to reception of a reading end instruction after reading a plurality of documents according to a plurality of reading instructions, images of documents obtained through the plurality of reading instructions,
   wherein the reading unit is configured to execute the second reading processing of reading the document based on the setting of the resolution received by the resolution receiving unit, based on the mode receiving unit having not received the setting of the reading mode,
   wherein the reading unit is configured to read a plurality of documents to be read through the plurality of reading instructions with a setting of a same resolution based on the mode receiving unit having received the setting of the reading mode.

5. The document reading apparatus according to claim 4, wherein, based on the reading mode being set by the mode receiving unit, the reading unit reads a plurality of documents to be read through the plurality of reading instructions with the setting of the same resolution, not based on the resolution received by the resolution receiving unit.

6. The document reading apparatus according to claim 4, wherein the first reading processing reads a document with the setting of the first resolution,
   wherein the second reading processing is capable of reading the document with the setting of a first resolution or a second resolution smaller than the first reading resolution, and
   wherein, when reading the document by using the second reading processing, the reading unit reads the document with the setting of the first reading resolution.

7. A method for controlling a document reading apparatus, the method comprising:
   conveying a document:
   executing first reading processing of reading a document on a platen glass and second reading processing of reading a document being conveyed in the conveying;
   receiving a setting of a resolution in the second reading processing; and
   receiving a setting of a reading mode for outputting, according to reception of a reading end instruction after reading a plurality of documents according to a plurality of reading instructions, images of documents obtained through the plurality of reading instructions,
   wherein the second reading processing of reading the document is executed based on the setting of the resolution received, based on the setting of the reading mode having not been received, and
   wherein a plurality of documents to be read through the plurality of reading instructions is read with a setting of a same resolution based on the setting of the reading mode having been received.

* * * * *